United States Patent
Margutti et al.

(10) Patent No.: US 8,643,938 B2
(45) Date of Patent: Feb. 4, 2014

(54) MICROCAPSULE, SYSTEM COMPRISING MICROCAPSULES, METHOD FOR CHANGING THE STATE OF AT LEAST ONE SUCH MICROCAPSULE AND APPARATUS THEREFOR

(75) Inventors: Simona Margutti, Reutlingen (DE); Florian Rothfuss, Stuttgart (DE); Karola Rath, Stuttgart (DE); Simon Voigt, Stuttgart (DE)

(73) Assignee: Fraunhofer-Gesellschaft zur Förderung der angewandten For-Schung e.V., München (DE)

( * ) Notice: Subject to any disclaimer, the term of this patent is extended or adjusted under 35 U.S.C. 154(b) by 505 days.

(21) Appl. No.: 13/003,452

(22) PCT Filed: Jul. 8, 2009

(86) PCT No.: PCT/EP2009/004938
§ 371 (c)(1),
(2), (4) Date: Mar. 31, 2011

(87) PCT Pub. No.: WO2010/003654
PCT Pub. Date: Jan. 14, 2010

(65) Prior Publication Data
US 2011/0180745 A1 Jul. 28, 2011

(30) Foreign Application Priority Data
Jul. 11, 2008 (DE) .......................... 10 2008 032 610

(51) Int. Cl.
*G02B 26/00* (2006.01)
(52) U.S. Cl.
USPC ........................................................ 359/296

(58) Field of Classification Search
USPC .......................................... 359/296; 345/107
See application file for complete search history.

(56) References Cited

U.S. PATENT DOCUMENTS 5,492,789 A    2/1996   Igarashi et al.

FOREIGN PATENT DOCUMENTS

| JP | 07175165  | 7/1995 |
|----|-----------|--------|
| JP | 11 161205 | 6/1999 |

(Continued)

OTHER PUBLICATIONS

International Search report corresponding to International Application No. PCT/EP2009/004938, dated Oct. 7, 2009.

(Continued)

*Primary Examiner* — Joseph P Martinez
(74) *Attorney, Agent, or Firm* — Renner, Otto, Boisselle & Sklar, LLP

(57) ABSTRACT

The invention relates to a microcapsule, a system comprising microcapsules, and a corresponding method and apparatus, the microcapsule (11) comprising a core (12) which is encapsulated by an envelope (14) and in which at least one particle (16) having a motion component (17) and an indication component (18) is provided, the substance of the core (12) being capable of being transferred, at least for a short time, by an input of energy from a solid state or higher-viscosity state to a low-viscosity state, the at least one particle (16) being capable of undergoing a change in its position and/or orientation due to an input of energy occurring during the low-viscosity state of the substance of the core (12), and the substance of the core (12) reverting back, upon completion of the energy input, to the solid state or higher-viscosity state, thereby immobilizing the at least one particle (16) in its new position and/or orientation.

14 Claims, 2 Drawing Sheets

(56) References Cited

FOREIGN PATENT DOCUMENTS

Figure 1:
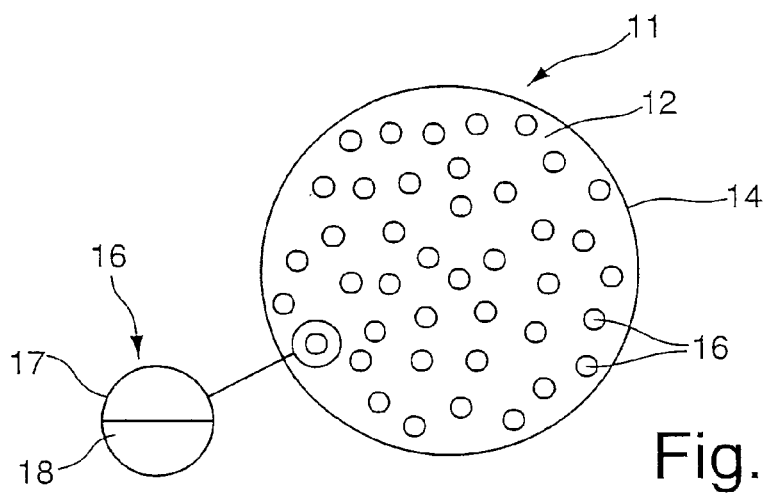

| | | | | |
|---|---|---|---|---|
| JP | 11161205 A | * | 6/1999 | ................ G09F 9/37 |
| WO | 2007/099597 | | 9/2007 | |
| WO | 2008/009216 | | 1/2008 | |

OTHER PUBLICATIONS

Ozin, et al., "P-Ink and Elast-Ink from lab to market", Materials Today, vol. 11, No. 7 and 8, Jul. 1, 2008, pp. 44-51.

* cited by examiner

MICROCAPSULE, SYSTEM COMPRISING MICROCAPSULES, METHOD FOR CHANGING THE STATE OF AT LEAST ONE SUCH MICROCAPSULE AND APPARATUS THEREFOR

This application is a U.S. National Stage application claiming the benefit of prior filed International Application Number PCT/EP2009/004938, filed on Jul. 8, 2009, in which the International Application claims priority from German Patent Application Number 10 2008 032 610.0, filed on Jul. 11, 2008, the entire contents of which are incorporated herein by reference.

The invention relates to a microcapsule, a system comprising microcapsules, a method of changing the state of at least one microcapsule and an apparatus for carrying out said method.

U.S. Pat. No. 6,120,588 A discloses an electrically addressable ink containing microcapsules having first particles with a first colour that comprises a first charge and second particles with another colour that comprises a second charge of opposite polarity. Applying an electric field having a first polarity to the microcapsule effects a perceivable change in colour by causing the first or the second particles to migrate in a direction responsive to said field. These microcapsules are used in paper-like displays and/or in what is generally referred to as electric paper. These microcapsules are disposed in a reversible manner within the carrier medium. By changing the electric field, the most recent disposition and orientation of the particles within the microcapsules may be reversed again. This electric paper may thus be rewritten on any number of times.

As an alternative to this electrically addressable ink, a solution referred to as photonic ink has been developed. Photonic crystals are composed of materials having periodically dielectric or metal-dielectric nanostructures which permit the propagation of electromagnetic waves. The way in which photons propagate through said structure depends on their wavelength. Individual wavelengths are known as modes, not permitted wavelength bands are referred to as photonic band gaps. For photoelectric applications, it is desirable that a photonic crystal should have a tuneable stop band which may be controlled in a conventional manner so as to obtain what is referred to as actively tuneable opals. Considerable efforts have been made to achieve this objective by modifying the refractive indices of the material and the lattice constants or the three-dimensional symmetry of the crystals through the application of mechanical forces (WO 08/098339 EA), through electric fields (US 2004/131799 A) or through magnetic fields (WO 09/017525 A).

Magnetically induced, photonic inks are based on the practice of exposing photonic crystals to the influence of a magnetic field. Photonic ink is composed of superparamagnetic, colloidal photonic crystals. The periodic structures which, in turn, are typically formed from monodisperse, colloidal blocks, contain the magnetic components. Said monodisperse, colloidal blocks are composed of colloidal, nanocrystalline clusters comprising superparamagnetic magnetites ($Fe_3O_4$) encapsulated within polyacrylate. These clusters are induced by a magnetic field so as to occupy a three-dimensional structure and they form colloidal, photonic crystals having high, tuneable stop bands which may be moved throughout the entire visible spectrum. The colour displayed is dependent on the nanocrystalline clusters and varies depending on the distance represented by the balance between the repulsive electrostatic force (negatively charged surfaces encapsulated by polyacrylate) and the attractive force of the magnetite nanoclusters in the magnetic field.

The intensity of the magnetic field applied will determine the individual colour nuances obtained. As an alternative, the magnetic field may be substituted by an electric field or by mechanical forces. Systems such as those mentioned above, which are known from WO 08/098339 A and US 2004/131799 A, may similarly be tuneable in terms of colour shade in dependence of the mechanical forces and electric fields applied thereon. However, this system has the disadvantage that the tuned colour of the photonic crystals is only maintained as long as the latter are acted upon by the electric or magnetic fields or by the mechanical forces. The field of application of such photonic inks is therefore very limited.

Summarising of the prior-art, the following applications are known:
- a microcapsule in which two particles having different electrostatic charges are contained such that their positioning within the capsule can be changed by applying an electric field (U.S. Pat. No. 6,120,588);
- photonic crystal lattice structures that may be modified (e.g.
- mechanically, magnetically) by external energy (WO 08/098339 A, US 2004/131799 A, WO 09/017525 A);
- a process of incorporation of nanoparticles into microcapsules (WO 08/009216).

The state of the art does not disclose any microcapsule-based system making it possible to position particles within the capsule in a specific manner, to control their movement, position and/or orientation, and to immobilise them so that no further energy input is needed for maintaining said most recently tuned position, location and/or orientation.

The invention is therefore based on the object of proposing a microcapsule, a system comprising microcapsules, and a method of changing the state of at least one microcapsule as well as an apparatus for carrying out said method whereby a specific positioning and immobilisation of particles within a microcapsule is made possible, the aim being to change the specificity of the characteristics (e.g. optical, physical, chemical, electric) of the microcapsule.

This object is achieved according to the invention by the characteristics of claim 1. Owing to the configuration of the microcapsules according to the present invention, which comprise a core having a substance the rheological behaviour and/or viscosity of which can be modified and which is capable of reverting back to an initial state, a memory effect can be obtained. This memory effect makes it possible to maintain a set position of at least one particle disposed within the substance without requiring any external energy input. In order to proceed to the setting of a preferred position and/or orientation of a particle having a motion component and an indication component, the substance is transferred from a solid state or high-viscosity state to at least a low-viscosity state, which makes it possible for the position and/or orientation of at least one particle to be changed.

When an input of a substance-activating energy aimed at transferring the substance to a low-viscosity state terminates, said substance will revert back to a solid state or high-viscosity state and thus immobilise the at least one particle in its new position and/or orientation. Thus a freely programmable microcapsule has been created which may be set in accordance with the requirements of various fields of application. Once the programming of the microcapsule is completed, preferably no further energy from outside is needed to maintain the position of the at least one particle within the microcapsule. This configuration of the microcapsule has the additional advantage that once set or programmed, said state or condition may subsequently be undone and changed. This microcapsule may thus be changed repeatedly and may be modified and re-set, as needed, so as to accommodate different conditions as far as the position and/or orientation of the at least one particle is concerned. This permits various different utilisations and fields of application.

In summary, there are two types of external energy inputs which are used for positioning the particles in the microcapsule and for their immobilisation in the set position:

The substance-activating energy which is operable for transferring the matrix material of the microcapsule wherein the particles are dispersed to a low-viscosity state. The substance-activating energy may, for example, be thermal radiation (infrared light source) in cases in which the matrix consists, for example, of a latent heat storage material such as wax or gelatine. Alternatively, electromagnetic radiation of a certain wavelength (e.g. UV) may be used, in cases in which the matrix is a photorheological material which changes its viscosity in dependence of an exposure to light of a certain wavelength.

The particle-activating energy which is operable for positioning the at least one particle dispersed in the matrix and contained by the wall of the microcapsule. The particle-activating energy is operable for both the absolute positioning of the particles within the capsule (e.g. the concentration of the particles next to the capsule wall) and the relative positioning of the particles with respect to each other (for example the formation of a crystal lattice structure). The particle-activating energy is, for example, a magnetic field (permanent magnet or electromagnet) in cases in which the particles are provided with magnetic, paramagnetic or superparamagnetic properties. Alternatively, an electric field may be used, in cases in which the particles are provided with an electrostatic charge.

According to a preferred configuration of the microcapsule, provision is made for the viscosity of the substance that may be modified by the substance-activating energy to be created by thermal radiation or by electromagnetic radiation. Thus, it is possible for the substance-activating energy, as it acts upon the substance, to exert no, or no substantial, action on the at least one particle, such that said substance-activating energy will act exclusively and specifically on the substance. Provision is preferably made for the substance to consist of a softening agent or an emulsifying agent enabling the change of state.

According to another preferred configuration of the microcapsule, provision is made for the position and/or orientation of the at least one particle to be capable of being modified by means of a particle-activating energy created by an electromagnetic field or an electric field or a magnetic field. It is thus possible for the electric, magnetic, or electromagnetic field to exert no, or next to no, action on the state of the substance in the core of the microcapsule, such that this energy acts on the motion component of the at least one particle to enable a change in its position and/or orientation.

According to a further preferred configuration of the microcapsule, provision is made for at least one particle to be provided and which is capable of being changed, as to its position and/or orientation, by a first particle-activating energy, and for at least one further particle to be provided which is capable of being activated by a particle-activating energy that is different from the first particle-activating energy. Thus different particles within one microcapsule can be modifiable in a targeted manner, which makes it possible to obtain specific and finely tuneable effects. Alternatively, it is possible to modify the states and properties of certain individual microcapsules, supposing that these are provided with particles that are activatable by certain specific types of energy.

Furthermore, provision is preferably made for at least one particle present in the microcapsule to include at least one indication component which has an optical, reflecting, absorbing or physical function. Thus it is possible to select different functionalities, depending on the utilisations and fields of application envisaged for such microcapsules.

The at least one particle present in the microcapsule is preferably made of magnetisable material or of a material holding an electric charge and preferably has a motion component that comprises an electric or magnetic charge. This permits the activation thereof in a simple manner. The particles are realised as supermagnetic magnetite particles.

According to a further alternative configuration of the invention, provision is made for the microcapsule to have particles incorporated therein which are arranged to form a colloidal, photonic crystal when exposed to an external energy while the matrix is in a low-viscosity state. In particular, the iron oxide particles described in WO 09/017525 A may suitably be used for this purpose. The crystal lattice structure set by means of a magnetic field during the low-viscosity state of the matrix is then immobilised by removing the substance-activating energy and transferring the matrix to a higher-viscosity state. Thus it is possible to tune the wavelength of light reflected by the microcapsule over a wide spectrum and to freeze the state of reflection as it has been set without the necessity of any further energy input to maintain said condition. In addition, owing to the encapsulation of the system by means of a microcapsule, it is possible to achieve excellent processing properties of the material. For example, the material may be printed or painted on surfaces or incorporated into other materials. Advantageously, both the envelope of the microcapsule and the matrix are, as far as possible, formed in a transparent manner so as to avoid any disturbances in the reflexion of light waves.

The object of the invention is further achieved, according to the invention, by a system comprising microcapsules in which system a plurality of microcapsules is dispersed in a carrier medium. The carrier medium in the system comprising microcapsules may be, for example, a coating material forming thin layers such as sprayed particles and metal alloys which are used in the field of micro-electronics in order to obtain precisely tuneable physical properties. Other examples of a carrier medium may be metal oxides which are used for ophthalmic coatings for realising precisely tuneable optical effects such as the refractive index for light, colours, etc. Generally speaking, the microcapsules of the present invention may be incorporated both in solid and in liquid formulations (Reza Arshady, Microspheres Microcapsules & Liposomes (MML Series) Preparation & Chemical Applications Vol. 1 Citus Book, London 1999; Swapan K. Ghosh, Functional coatings: by polymer microencapsulation, Wiley-VCH. 2006: Simon Benita, Microencapsulation: Methods and Industrial Applications, Simon Benita editor 2006). In liquid formulations, the encapsulated system may be utilised, for example, in paints used in the automotive industry where a shading of vehicle colours or the display of advertisements may be obtained. The encapsulated formulation may equally be added to plastic components during the fabrication process, thus making it possible to improve the durability of plastic articles such as plastic bags, plastic utensils, covers or labels. The microcapsules of the present invention may equally be added to printable media in order to provide a rewritable system. [U.S. Pat. No. 6,045,955].

Furthermore, provision is preferably made for at least one microcapsule in the system comprising microcapsules to have a core substance in which the change in viscosity from a solid state or higher-viscosity state to a low-viscosity state takes place on a level differing from that of a core substance of at least one further microcapsule. This allows greater flexibility in the setting of different effects. It is thus possible to set not only the states of the particles within the microcapsules but to distinguish the states of said microcapsules themselves with respect to each other.

Such microcapsules may equally be used in LCD or OLED displays, touch panels, solar cells or the like. In these cases, high-density atomised zones including, for example, indium zinc oxide, aluminium-doped zinc oxide, or the like may be provided as a carrier.

The carrier medium for microcapsules may also be realised in the form of wear-resistant coatings or decorative coatings which are used in various different products such as door handles, telephones, computers, seats, articles of furniture, bathroom and sanitary fixtures as well as motor vehicle components.

Other carrier media for systems comprising said microcapsules may include paints, varnishes or inks the colours of which will thus become tuneable. Further carrier media may be water and woven textiles, fabrics or non-woven tissues to which microcapsules for optically tuneable textiles may be applied by means of adhesion materials such as gelatine or the like.

The object of the invention is further achieved, according to the invention, by a method of changing the state of at least one microcapsule in a system comprising microcapsules wherein at least one microcapsule is exposed to both a particle-activating energy and a substance-activating energy. In this process, provision is preferably made for the core substance to be first transferred, with the aid of the substance-activating energy, from a solid state or higher-viscosity state to a low-viscosity state. Subsequently, the particle-activating energy begins to act, so that the position and orientation of the at least one particle is changed. The action of the particle-activating energy is maintained until the core substance has transitioned back to a higher-viscosity state or solid state, so that the newly programmed position and/or orientation of the particle(s) will be maintained. In the course of this process, the substance-activating energy and the particle-activating energy may be acting simultaneously. Preferably, however, the particle-activating energy is activated in a time-delayed manner. While the positions and/or orientations of the particles are changed, the substance-activating energy may preferably remain in action. In dependence of the substance of the core, the latter may also be turned off, once the transfer back to a viscous state has taken place, so that the positioning of the particles and/or their orientation is done within the time span before the substance transitions to a higher-viscosity state or solid state.

Furthermore, provision is preferably made for the substance-activating energy used for changing the state of the substance of the core to be generated by thermal radiation, in particular by an infrared light source, or by electromagnetic radiation, in particular by a UV lamp, or by a laser device. In dependence of the materials used, either the one or the other of these energy sources may be utilised.

Furthermore, provision is preferably made for the particle-activating energy used for changing the position and/or orientation of the particle(s) to be generated by a magnetic field, for example of a permanent magnet or an electromagnet, or by an electric field. This will depend on the configuration of the particles, so that depending on the specific application the generation of a magnetic field or an electric field may be selected.

According to a further preferred configuration of the method, provision is made for the substance-activating energy to act in a planar manner on a carrier medium in which the microcapsules are dispersed and for the particle-activating energy to be supplied in a targeted manner, focused on individual microcapsules. This permits to obtain a specific and well-defined change of state of the microcapsules. For example in a case in which the colour of the microcapsule is to be changed this may permit to set a specific colour pattern, colour grid or security pattern.

Alternatively, provision may be made for the particle-activating energy to act in a planar manner and the substance-activating energy to be input in a targeted manner. This permits to obtain an identical effect.

Furthermore, provision may preferably be made for the substance-activating energy and the particle-activating energy to be input in a contactless manner. This opens up a wide range of applications.

The object of the invention is further achieved, according to the invention, by an apparatus for acting upon a system containing microcapsules which comprises at least one energy source for the input of substance-activating energy and at least one energy source for the input of particle-activating energy.

This apparatus is preferably provided with two separate energy sources which may be manipulated and/or activated independently of each other, such that the input of substance-activating energy is independent, both in its direction and manner of activation, of the input of particle-activating energy.

Figure 2A:
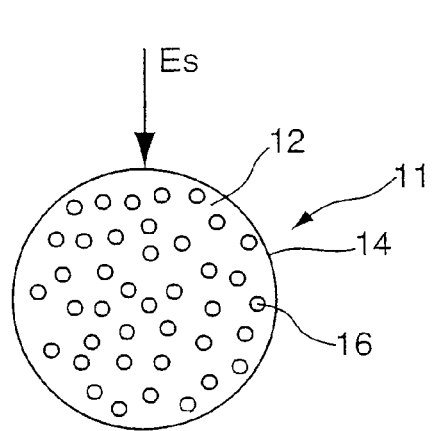
Figure 3A:
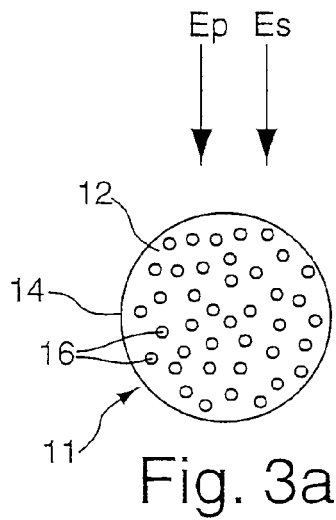
Figure 3B:
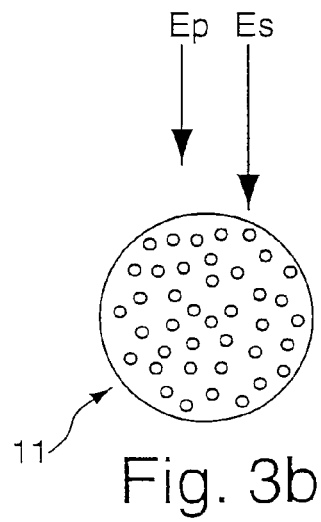
Figure 3C:
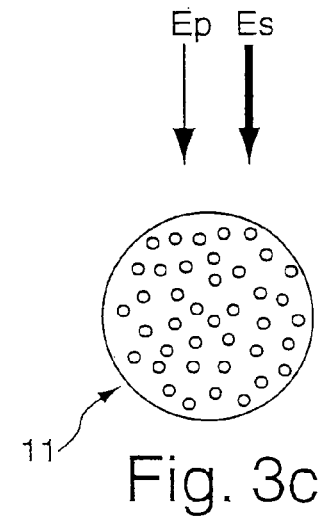
Figure 4:
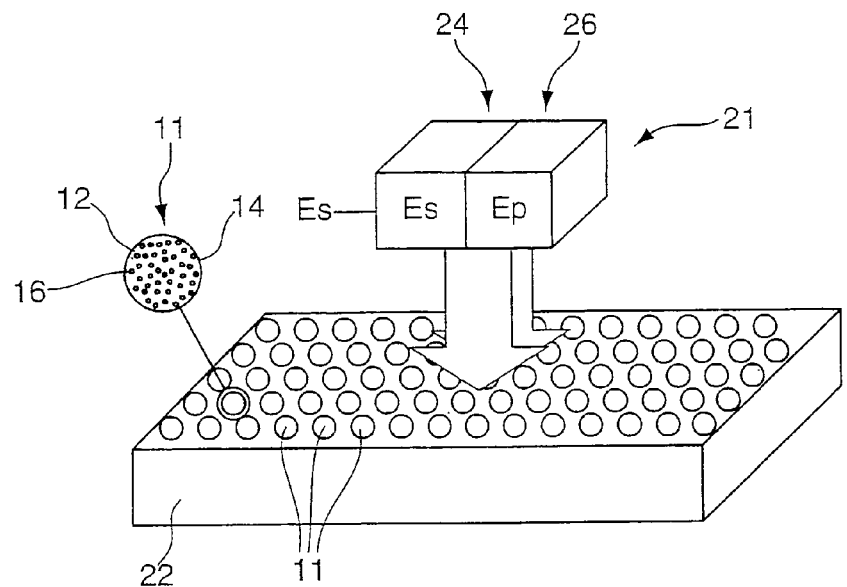
Figure 5:
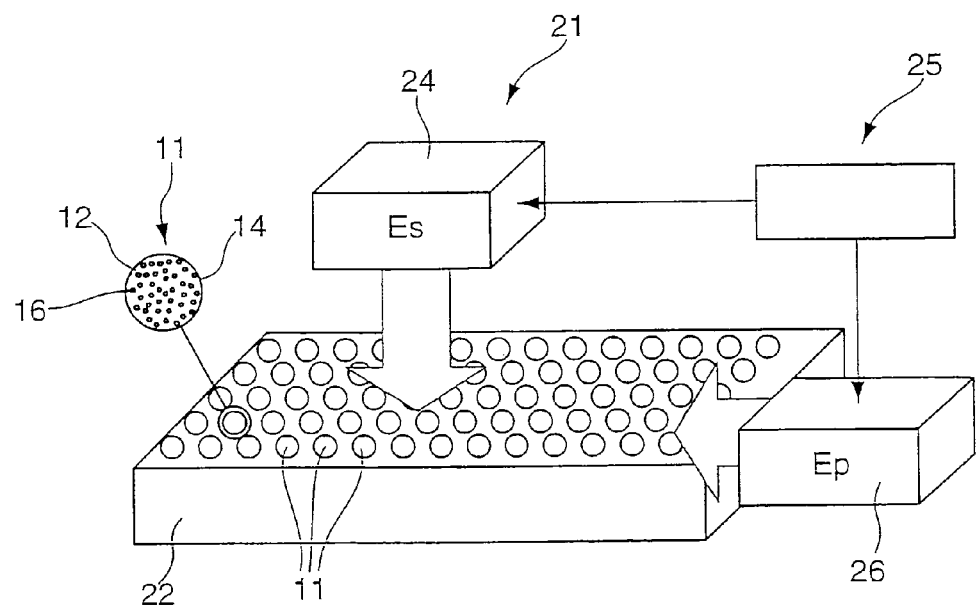

The invention, as well as other advantageous embodiments and developments thereof, will be described and explained in greater detail in the following, with reference being made to the examples shown in the drawings. The characteristics issuing from the description and the drawings may be applied according to the present invention either individually or as a plurality of features taken in any combination. In the drawings:

FIG. 1 is a schematic representation of a microcapsule according to the present invention, FIGS. 2a+b are schematic views of a first and a further embodiment of a microcapsule, FIGS. 3a-c are schematic sectional views of microcapsules with different types of energy input, FIG. 4 is a first embodiment of an apparatus for changing the state of microcapsules, and FIG. 5 is an alternative embodiment of an apparatus permitting to change the state of microcapsules.

FIG. 1 represents a schematic sectional view of a first embodiment of a microcapsule 11. This microcapsule 11 comprises a core 12 surrounded by at least one envelope 14 which is preferably transparent. Particles 16 are provided within the core 12. These particles 16 comprise a motion component 17 and an indication component 18. The motion component 17 enables the particle 16 to be activatable by means of an energy input. This may be done electrically or magnetically, which is to say that the motion component will have magnetic or electric properties. The indication component 18 may comprise, for example, optical, chemical, physical properties in order to achieve various different effects.

The core 12 of the microcapsule 11 consists of a substance having a viscosity which can be modified in dependence of an energy input. The material making up said substance is preferably selected depending on criteria such as hardness or density, refraction index and solubility. Furthermore, the chemical capability, the stability and the material making up the particles are taken into consideration so as to ensure chemical compatibility between the particles and the substance. The main characteristic of the substance, however, is its viscosity, which changes as a result of an energy input by a substance-activating energy such as thermal radiation or electromagnetic radiation. There is a need for a high degree of viscosity so that it is possible to immobilise the particles in a certain position, in such manner that even under the action of a particle-activating energy a change in position and/or orientation of the particles is precluded. Such change should be possible only at a point in time when sufficiently low viscosity conditions have been created, or in other words, when the substance has reached a low-viscosity state. In addition, it is of importance, when selecting the material for the substance, to ensure that subsequent to the energy input a rapid return from a low-viscosity state to a higher-viscosity state or solid state will take place. In some individual cases, for example with electrophoretic systems, it is advantageous to provide softening agents or emulsifying agents in addition to the optically active elements such as dyestuffs or in addition to the charge carriers in order to prevent agglomeration.

Substances such as, for example, phase change materials (PCMs) may be provided for making up the core 12. Furthermore, polymers having appropriate glass transition temperatures as well as photorheological, electrorheological or magnetorheological liquids may be provided. The viscosity of phase change materials such as paraffins may be determined by the action of thermal energy. The degree of viscosity may thus be changed depending on the thermal energy supplied. If the substance of the core 12 is a polymer, the input of thermal energy will bring it to its glass transition temperature and consequently lead to a change in the polymer viscosity. In cases in which the substances of the core 12 consist of photorheological, electrorheological or magnetorheological liquids, the change in viscosity is caused by the application of light or of an electric field or a magnetic field. Examples of photorheological liquids that are suitable, upon exposure to UV light, to undergo a transition from a solid or gel-like state to a liquid state include liquids consisting of cationic surface-active cetyltrimethyl ammonium bromides (CTABs) in combination with photosensitive organic acids or salts. One example of a photosensitive organic salt is trans-ortho-methoxycinnamic acid described, for example, as OMCA in J. Am. Chem. Soc. 2007, 129, 1553-1559. Further examples of photorheological materials are polymer networks containing azobenzene (Macromolecules 1999, 32, 3195-3200) and dendritic organogel (Chem. Commun., 2007, 4233-4235). The envelope 14 is preferably made of polymers or a polymer matrix and may serve as a limiting, physical border between the core of the microcapsule 11 and a carrier material in which said microcapsules are dispersed.

The particles 16 may be directly dispersed into the substance of the core or may be supplied in the form of an emulsion. Polymer dispersing systems of this type may equally be provided.

Only particles 16 of the same kind may be provided within one microcapsule 11. Alternatively, provision may be made for dissimilar particles 16 to be contained within a microcapsule 11. These dissimilar particles 16 may differ from one another in terms of their motion component 17 and/or their indication component 18.

The microcapsules 11 are incorporated in a system which comprises a carrier medium. Furthermore, this carrier medium may be provided in solid or liquid form and may have different degrees of viscosity. Both organic and inorganic materials may be equally suitable for receiving the microcapsules, depending on the specific applications envisaged. By way of example, the system may be applied to a surface, for example of automotive components or body parts, in the form of a high-viscosity paint which, after curing, yields a solid coating with a colour which may be modified and tuned in dependence of the energy supplied. The microcapsules 11 preferably comprise a diameter of less than 1 cm, in particular less than 500 µm. In special cases, however, the microcapsules 11 may even comprise a diameter of less than 1 µm.

Figure 2B:
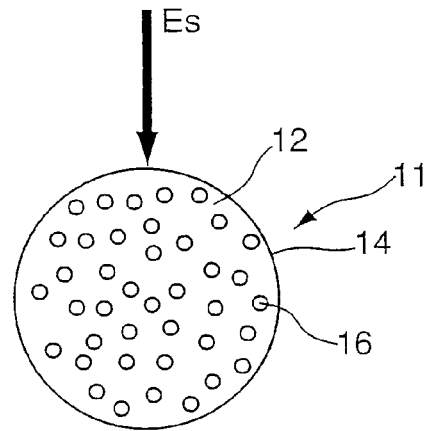

FIGS. 2a and 2b show microcapsules 11 in which the respective substances of the core 12 are dissimilar from each other. For example, the substance of FIG. 2a, although exposed to a lower level of substance-activating energy, will be of higher viscosity, than that of the microcapsule 11 of FIG. 2b, so that the particles 16 may change their position and/or orientation at an earlier stage. Alternatively, provision may be made for different substances to be subject to changing at almost the same energy level. This is true, for example, of wax C15 and wax C16.

FIGS. 3a to 3c show in an exemplary manner the energy input causing the change of the state of the microcapsule 11. FIG. 3a provides an example in which the amounts of both substance-activating energy Es and particle-activating energy Ep are too small, so that no change in the state of the microcapsule 11 will occur. In FIG. 3b the substance-activating energy Es has been increased, i.e. a change in viscosity is in progress but has not yet achieved a sufficient degree for a change in position and orientation of the particles 16 to take place, despite the action of the particle-activating energy Ep. In FIG. 3c the substance-activating energy Es has increased sufficiently for causing a modification in the viscosity in such a manner that, in turn, a change of the particles 16 in their position and orientation due to the action of the prevailing particle-activating energy Ep is possible. Once the substance-activating energy Es has been turned off, the viscosity promptly decreases, thereby immobilising the particles 16 in their respective positions and/or orientations within the core substance.

FIG. 4 is a schematic arrangement of an apparatus 21 for changing the state of microcapsules 11 which are dispersed within a carrier medium 22. By way of example, an energy source 24 for substance activation and an energy source 26 for particle activation are provided within a housing. Alternatively, the respective energy sources 24, 26 may be formed separately but positioned with respect to each other so as to act simultaneously upon one and the same location.

FIG. 5 shows an alternative embodiment of the apparatus 21. For example, the two energy sources 24, 26 may be arranged spatially separated from one another so as to act on the carrier medium 22 in different directions, respectively, in order to individually address the substance in the core 12 and the particles 16.

Once the substance has been transferred to a low-viscosity state of the substance, the renewed change in viscosity back to the initial state may be effected by turning off the energy source Es or by means of some physical or chemical process. So this may be done by an activation through a further energy input or by an automatic deactivation over time.

The apparatus 21 may be activated both manually and automatically or with automated correlation of the energies to be applied in order to enable an optimally tuned, system-stabilising action of the matrix of the substance and the undergoing change over the variation of the functional particles. The energy input by the apparatus 21 may be performed either in a variably controllable manner, focusing only on one microcapsule 11, or may occur in a planar manner. The energy input effected by he energy sources 24, 26 of the apparatus 21 may be either contactless or in contact with the system comprising the microcapsules 11. The requisite, necessary, substantial coupling and tuning of the energies used in the apparatus 21 does not necessarily require the instruments implied to be coupled in space. A time-related coupling is not necessarily required either.

In the case of a spatial decoupling, a control unit 25 for the energy sources 24, 26 may be provided at a separate location.

Owing to their programmability, the microcapsules 11 according to the invention and/or the system comprising microcapsules according to the invention, are thus suitable for being used in a variety of fields of applications including, for example, colour-tuneable inks. In addition, paints and coatings may be provided the appearance of which can be changed at a later stage by supplying said energies. These systems comprising microcapsules may also be inserted, for example, into plastic components. In addition, these microcapsules can be incorporated into fabrics, making it possible, for example, to change the colour and/or aspect of items of clothing according to specific requirements. Likewise, these systems comprising microcapsules may also be used as security elements or magnetic strips for ID cards or credit cards by using the tuning of the orientation of the microcapsules as a means of encoding. In addition said systems comprising microcapsules may be used in security documents, access cards, and the like.

The invention claimed is:

1. A microcapsule which comprises a core that is encapsulated by an envelope, wherein at least one particle with a motion component and an indication component is provided in a substance forming the core which is capable of being transferred by the action of a substance-activating energy, at least for a short time, from a solid state or higher-viscosity state to a low-viscosity state, and wherein the at least one particle is capable of undergoing a change as to its position and/or orientation due to the action of a particle-activating energy occurring during the low-viscosity state of the substance of the core, and wherein the substance of the core reverts back, upon completion of the input of energy, to the solid state or higher-viscosity state, thereby immobilising the at least one particle in its new position and/or orientation, wherein only particles of the same kind are provided within the core and in that the microcapsule has particles incorporated therein which are arranged to form a colloidal, photonic crystal when exposed to an external energy while the substance forming the core is in the low-viscosity state, and in that the substance forming said core consists of a photorheological liquid.

2. The microcapsule as claimed in claim 1, wherein the viscosity of the substance of the core that may be modified by a substance-activating energy is created by electromagnetic radiation.

3. The microcapsule as claimed in claim 1, wherein the position and/or orientation of the at least one particle is capable of being modified by means of a particle-activating energy created by an electric field, a magnetic field, or an electromagnetic field.

4. The microcapsule as claimed in claim 1, wherein an electric or a magnetic charge is provided as a motion component for the at least one particle and in that the at least one particle is made of a magnetisable material, in particular in the form of supermagnetic magnetite particles, or is made of a material holding a charge.

5. The microcapsule as claimed in claim 1, wherein the envelope is transparent.

6. A system comprising microcapsules and having a carrier medium, wherein microcapsules as claimed in claim 1 are dispersed within the carrier medium.

7. The system comprising microcapsules as claimed in claim 6, wherein at least one microcapsule is provided which has a substance in which the change in viscosity leading from a solid state or higher-viscosity state to a low-viscosity state takes place on an energy level differing from that of the substance in at least one further microcapsule.

8. A method of changing the state of at least one microcapsule as claimed in claim 1, in a system comprising microcapsules in which the microcapsules are dispersed within a carrier medium, wherein the at least one microcapsule is exposed to a substance-activating energy acting thereon until the substance of the core has been transferred from a solid state or higher-viscosity state to a low-viscosity state, wherein the position and/or orientation of the at least one particle is changed by the action of a particle-activating energy while the substance of the core is in the low-viscosity state, and wherein the action of the particle-activating energy by which the changed position and/or orientation of the at least one particle has been made possible is maintained until the substance of the core has returned to a higher-viscosity state or solid state, characterised in that the substance used for the core is a photorheological liquid the viscosity of which is generated by electromagnetic radiation.

9. The method as claimed in claim 8, wherein the electromagnetic radiation is generated by a UV lamp, or by a laser device.

10. The method as claimed in claim 8, wherein the particle-activating energy used for changing the position and/or the orientation of the particles is generated by a magnetic field, for example of a permanent magnet or an electromagnet, or by an electric field.

11. The method as claimed in claim 8, wherein the substance-activating energy is supplied in a planar manner to the carrier medium having at least one microcapsule and that the particle-activating energy is supplied specifically focused on said at least one microcapsule.

12. The method as claimed in claim 8, wherein both the substance-activating energy and the particle-activating energy are supplied in a planar manner to the microcapsules.

13. The method as claimed in claim 8, wherein the substance-activating energy is supplied in different energy levels and/or that the particle-activating energy is supplied in different energy levels.

14. The method as claimed in claim 8, wherein the substance-activating energy and the particle-activating energy are applied in a contactless manner.

* * * * *

UNITED STATES PATENT AND TRADEMARK OFFICE
CERTIFICATE OF CORRECTION

PATENT NO. : 8,643,938 B2  Page 1 of 1
APPLICATION NO. : 13/003452
DATED : February 4, 2014
INVENTOR(S) : Margutti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 586 days.

Signed and Sealed this

Twenty-ninth Day of September, 2015

Michelle K. Lee
*Director of the United States Patent and Trademark Office*